United States Patent
Hirata

(10) Patent No.: US 9,853,963 B2
(45) Date of Patent: Dec. 26, 2017

(54) AUTHORIZATION SERVER, AUTHENTICATION COOPERATION SYSTEM, AND STORAGE MEDIUM STORING PROGRAM

(71) Applicant: CANON KABUSHIKI KAISHA, Tokyo (JP)

(72) Inventor: Kensuke Hirata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/364,824

(22) Filed: Nov. 30, 2016

(65) Prior Publication Data

US 2017/0163635 A1 Jun. 8, 2017

(30) Foreign Application Priority Data

Dec. 8, 2015 (JP) ................................. 2015-239749

(51) Int. Cl.
*H04L 29/06* (2006.01)
*H04W 12/06* (2009.01)

(52) U.S. Cl.
CPC ........ *H04L 63/0807* (2013.01); *H04L 63/083* (2013.01); *H04L 63/0853* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 6,510,236 B1 | 1/2003 | Crane et al. | |
| 7,685,206 B1 | 3/2010 | Mathew et al. | |
| 8,010,783 B1* | 8/2011 | Cahill | H04L 63/10 713/155 |
| 8,739,260 B1* | 5/2014 | Damm-Goossens | H04W 12/06 726/4 |
| 9,106,642 B1* | 8/2015 | Bhimanaik | G06F 21/335 |
| 9,420,463 B2 | 8/2016 | Mihaylov et al. | |
| 2005/0154913 A1* | 7/2005 | Barriga | G06F 21/33 726/4 |
| 2005/0228981 A1 | 10/2005 | Gavrillov et al. | |
| 2006/0015358 A1* | 1/2006 | Chua | G06Q 20/02 705/44 |
| 2007/0289002 A1* | 12/2007 | van der Horst | G06F 21/42 726/9 |
| 2008/0183628 A1* | 7/2008 | Oliver | G06Q 10/00 705/71 |
| 2009/0222900 A1* | 9/2009 | Benaloh | H04L 9/3213 726/9 |

(Continued)

FOREIGN PATENT DOCUMENTS

EP 2713300 A1 4/2014
JP 2015-518198 A 9/2015

*Primary Examiner* — Benjamin Lanier
(74) *Attorney, Agent, or Firm* — Canon USA Inc., IP Division

(57) ABSTRACT

An authorization token verification request including the authorization token is received from an application server having received a processing request along with the authorization token from the client, and, in a case where the authorization token is verified successfully on basis of the received authorization token and the authorization token information, the local user information included in the authorization token information is transmitted to the application server.

5 Claims, 15 Drawing Sheets

(56) References Cited

U.S. PATENT DOCUMENTS

| | | | |
|---|---|---|---|
| 2009/0271847 A1* | 10/2009 | Karjala | H04L 63/0807 726/6 |
| 2010/0235882 A1* | 9/2010 | Moore | G06Q 20/06 726/3 |
| 2013/0019297 A1* | 1/2013 | Lawson | H04W 76/02 726/7 |
| 2013/0125223 A1* | 5/2013 | Sorotokin | H04L 9/3213 726/6 |
| 2013/0318592 A1* | 11/2013 | Grier, Sr. | H04L 9/3234 726/9 |
| 2014/0044123 A1* | 2/2014 | Lawson | H04L 65/1023 370/352 |
| 2014/0189808 A1* | 7/2014 | Mahaffey | H04L 63/0853 726/4 |
| 2014/0245411 A1* | 8/2014 | Meng | H04L 63/08 726/7 |
| 2014/0373103 A1 | 12/2014 | Hirata | |
| 2015/0032627 A1* | 1/2015 | Dill | G06Q 20/385 705/44 |
| 2015/0046338 A1* | 2/2015 | Laxminarayanan | G06Q 20/20 705/67 |
| 2015/0254672 A1* | 9/2015 | Huesch | G06Q 20/02 705/44 |
| 2015/0281225 A1* | 10/2015 | Schoen | H04L 63/06 726/9 |
| 2015/0365399 A1* | 12/2015 | Biswas | G06F 9/00 726/8 |
| 2016/0063657 A1* | 3/2016 | Chen | G06F 21/45 705/325 |
| 2016/0134660 A1 | 5/2016 | Ponsini et al. | |
| 2016/0156700 A1 | 6/2016 | Chen | |
| 2016/0164878 A1 | 6/2016 | Nakano | |
| 2016/0269388 A1 | 9/2016 | Ezell et al. | |
| 2017/0034172 A1 | 2/2017 | Biggs et al. | |

* cited by examiner

| DOMAIN NAME 301 | USER NAME 302 | PASSWORD 303 |
|---|---|---|
| localserver1.net | user1 | ****** |
| localserver1.net | user2 | ******** |
| localserver2.net | user1 | ***** |
| localserver2.net | user2 | ********* |
| localserver2.net | user3 | ********* |

| CLIENT ID 401 | SECRET 402 | SCOPE 403 |
|---|---|---|
| client0001 | ******** | SVG_Preview |

| TEMPLATE ID 411 |
|---|
| 45787890-34e4-32a4-8921-446655440000 |

| CLIENT ID | SECRET | SCOPE | TENANT ID |
|---|---|---|---|
| client0001 | ******** | SVG_Preview | user_tenant1 |
| client0002 | ******** | SVG_Preview | user_tenant2 |
| client0003 | ******** | SVG_Preview | user_tenant3 |

| AUTHORIZATION TOKEN | EXPIRATION DATE | SCOPE | CLIENT ID | APPLICATION ID |
|---|---|---|---|---|
| AT_000000 | 09/30/2015 11:00.00 | SVG_Preview | client0001 | user1@localserver1.net |
| AT_000001 | 12/30/2015 12:00.00 | SVG_Preview | client0001 | user2@localserver1.net |
| AT_000002 | 12/30/2015 13:00.00 | SVG_Preview | client0003 | |
| AT_000003 | 09/30/2015 13:00.00 | SVG_Preview | client0002 | userB@xxxx.net |
| AT_000004 | 10/11/2015 00:40.00 | SVG_Preview | client0001 | user1@localserver1.net |

| TEMPLATE ID (601) | TENANT ID (602) | TEMPLATE URL PATH (603) |
|---|---|---|
| 45787890-34e4-32a4-8921-446655440000 | user_tenant1 | /frm/forms/45787890-34e4-32a4-8921-446655440000/45787890-34e4-32a4-8921-446655440000.fcp |
| 14290453-1ee2-33a5-5647-890771346112 | user_tenant1 | /frm/forms/14290453-1ee2-33a5-5647-890771346112/14290453-1ee2-33a5-5647-890771346112.fcp |
| 33677112-6c5b-8d71-3452-128923434545 | user_tenant2 | /frm/forms/33677112-6c5b-8d71-3452-128923434545/33677112-6c5b-8d71-3452-128923434545.fcp |

| PREVIEW ID (611) | TENANT ID (612) | USER ID (613) | DATA CONVERSION ID (614) | BUSINESS FORM PDF URL PATH (615) |
|---|---|---|---|---|
| ff169537-acd7-46f5-9cd6-73df860334f4 | user_tenant1 | user_tenant1_user1@localserver1.net | e31aafc9-7a6f-4f9f-9b4d-f3754bc08103 | /frm/formpdfs/ff169537-acd7-46f5-9cd6-73df860334f4/ff169537-acd7-46f5-9cd6-73df860334f4.pdf |
| 1dd3b180-57fe-11e4-8eca-0a85caef494e | user_tenant1 | user_tenant1_user2@localserver1.net | 994689f0-b088-4784-9d76-0e247ce7a11f | /frm/formpdfs/1dd3b180-57fe-11e4-8eca-0a85caef494e/1dd3b180-57fe-11e4-8eca-0a85caef494e.pdf |
| 8c5ea5a0-597b-11e4-8eca-0a85caef494e | user_tenant2 | user_tenant2_user1@localserver2.net | e322ee00-c74e-4225-b434-6291dc5deb2d | /frm/formpdfs/8c5ea5a0-597b-11e4-8eca-0a85caef494e/8c5ea5a0-597b-11e4-8eca-0a85caef494e.pdf |

| TENANT ID (621) | LOCAL AUTHENTICATION COOPERATION MODE (622) |
|---|---|
| user_tenant1 | true |
| user_tenant2 | false |
| user_tenant3 | true |

| DOCUMENT ID (701) | TENANT ID (702) | USER ID (703) | DOCUMENT URL PATH (704) |
|---|---|---|---|
| d2b3604d-b3cb-49d3-81bc-3a8de3bc1b98 | user_tenant1 | user_tenant1_user1@localserver1.net | /frm/formpdfs/ff169537-acd7-46f5-9cd6-73df860334f4/ff169537-acd7-46f5-9cd6-73df860334f4.pdf |
| 3d3a7b75-171a-4e8e-b4be-f927aa2f6a0a | user_tenant1 | user_tenant1_user2@localserver1.net | /frm/formpdfs/1dd3b180-57fe-11e4-8eca-0a85caef494e/1dd3b180-57fe-11e4-8eca-0a85caef494e.pdf |
| 70618aee-867d-4a7a-9f37-ed210d399120 | user_tenant2 | user_tenant2_user1@localserver2.net | /frm/formpdfs/8c5ea5a0-597b-11e4-8eca-0a85caef494e/8c5ea5a0-597b-11e4-8eca-0a85caef494e.pdf |

| DATA CONVERSION ID (711) | TENANT ID (712) | USER ID (713) | DOCUMENT ID (714) | INDEX URL PATH (715) | STATUS (716) |
|---|---|---|---|---|---|
| e31aafc9-7a6f-4f9f-9b4d-f3754bc08103 | user_tenant1 | user_tenant1_user1@localserver1.net | d2b3604d-b3cb-49d3-81bc-3a8de3bc1b98 | /cnv/convertjocs/e31aafc9-7a6f-4f9f-9b4d-f3754bc08103/index/index.json | CONVERTED |
| 994689f0-b088-4784-9d76-0e247ce7a11f | user_tenant1 | user_tenant1_user2@localserver1.net | 3d3a7b75-171a-4e8e-b4be-f927aa2f6a0a | /cnv/convertjocs/994689f0-b088-4784-9d76-0e247ce7a11f/index/index.json | CONVERTED |
| e322ee00-c74e-4225-b434-6291dc5deb2d | user_tenant2 | user_tenant2_user1@localserver2.net | 70618aee-867d-4a7a-9f37-ed210d399120 | /cnv/convertjocs/e322ee00-c74e-4225-b434-6291dc5deb2d/index/index.json | STANDBY |

| TENANT ID (721) | LOCAL AUTHENTICATION COOPERATION MODE (722) |
|---|---|
| user_tenant1 | true |
| user_tenant2 | false |
| user_tenant3 | true |

FIG. 8

| DATA URL | FILE PATH |
|---|---|
| https://storage.net/frm/forms/45787890-34e4-32a4-8921-446655440000/45787890-34e4-32a4-8921-446655440000.fcp | /frm/forms/45787890-34e4-32a4-8921-446655440000/45787890-34e4-32a4-8921-446655440000.fcp |
| https://storage.net/frm/formpdfs/ff169537-acd7-46f5-9cd6-73df860334f4/ff169537-acd7-46f5-9cd6-73df860334f4.pdf | /frm/formpdfs/ff169537-acd7-46f5-9cd6-73df860334f4/ff169537-acd7-46f5-9cd6-73df860334f4.pdf |
| https://storage.net/frm/formpdfs/1dd3b180-57fe-11e4-8eca-0a85caef494e/1dd3b180-57fe-11e4-8eca-0a85caef494e.pdf | /frm/formpdfs/1dd3b180-57fe-11e4-8eca-0a85caef494e/1dd3b180-57fe-11e4-8eca-0a85caef494e.pdf |
| https://storage.net/cnv/convertjobs/e31aafc9-7a6f-4f9f-9b4d-f3754bc08103/index/index.json | /cnv/convertjobs/e31aafc9-7a6f-4f9f-9b4d-f3754bc08103/index/index.json |
| https://storage.net/cnv/convertjobs/e31aafc9-7a6f-4f9f-9b4d-f3754bc08103/data/page1.svg | /cnv/convertjobs/e31aafc9-7a6f-4f9f-9b4d-f3754bc08103/data/page1.svg |
| https://storage.net/cnv/convertjobs/e31aafc9-7a6f-4f9f-9b4d-f3754bc08103/data/page2.svg | /cnv/convertjobs/e31aafc9-7a6f-4f9f-9b4d-f3754bc08103/data/page2.svg |

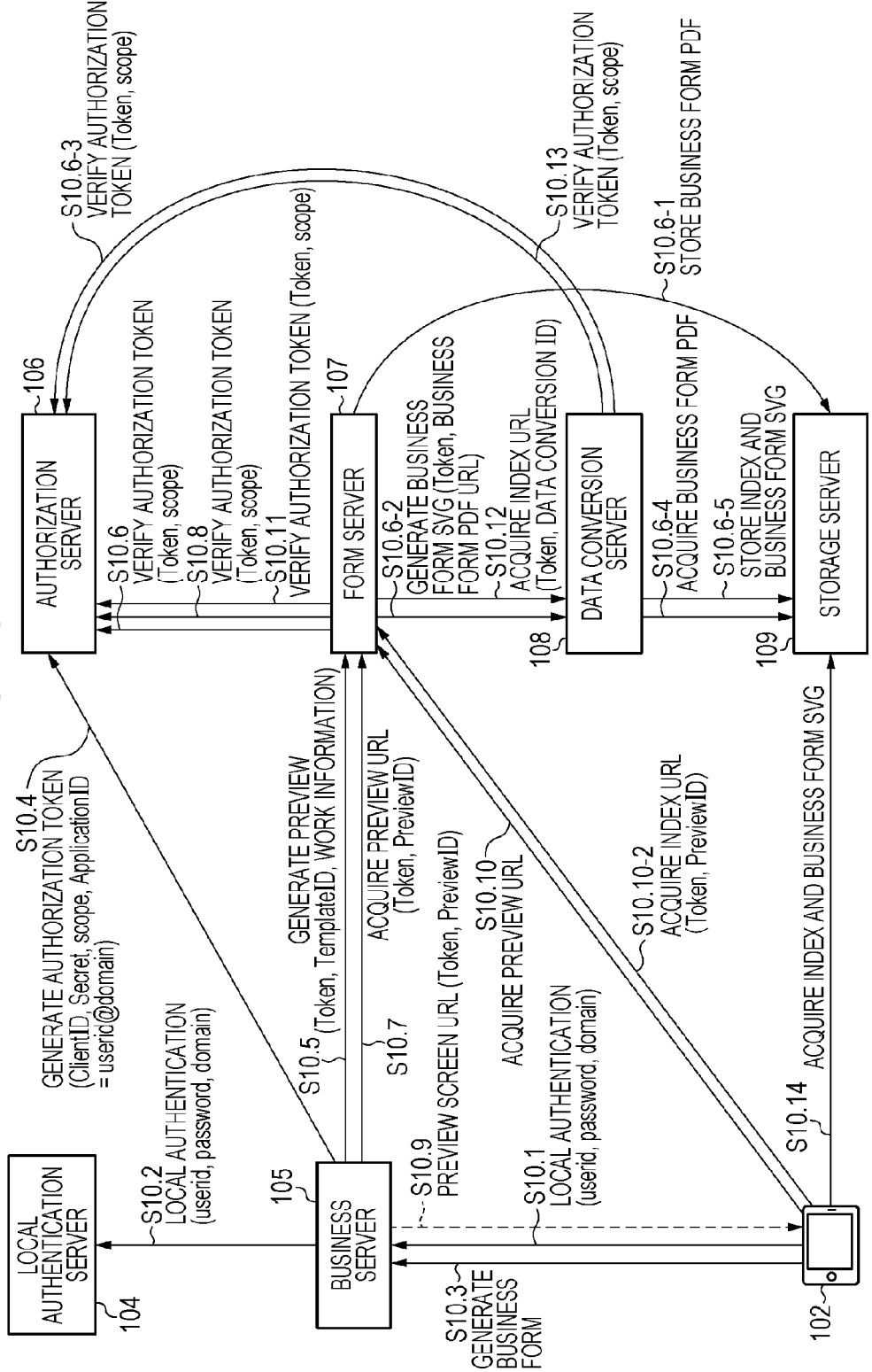

AUTHORIZATION SERVER, AUTHENTICATION COOPERATION SYSTEM, AND STORAGE MEDIUM STORING PROGRAM

BACKGROUND OF THE INVENTION

Field of the Invention

The present invention relates to an authorization server, an authentication cooperation system between a service of cloud services, for example, and a local service, and a storage medium storing a program.

Description of the Related Art

In recent years, cloud computing services (or cloud services) which make a server open to the Internet to provide services to a client have gathered attention. Fundamentally, a cloud computing service may distribute and execute data conversion and data processing by using many computing resources and process requests from many clients in parallel by performing distributed parallel processing. Presently, there are so many venders each of which implements a Web service on a cloud computing service environment for realizing a cloud computing service as described above, resulting in a wide variety of services provided on the Web. In developing a cloud service, many services which have already been provided on the web may be effectively used to provide a new function so that advantages can be gained with respect to development speed and development costs. On the other hand, in the past, a carrier, for example, may possess its own servers and so on and operate many ON-premise systems. Transferring all internal systems to a cloud service together may be difficult. Hence, partial ON-premise systems may be transferred to a cloud service in stepwise manner. As a result, an increased number of users may utilize both of an ON-premise service and a cloud service in cooperation with each other. See PCT Japanese Translation Patent Publication No. 2015-518198.

SUMMARY OF THE INVENTION

When an ON-premise service and a cloud service in cooperation are used, Single Sign On (hereinafter, also called SSO) strongly desirable because local authentication (such as LDAP) as in a conventional ON-premise system and a cloud authentication are different. According to a conventional technology, a local authentication of an ON-premise system may be synchronized with a local authentication service constructed in a cloud service so that a login to a login service of both of the cloud service and the ON-premise system can start a user ID provisioning. This, for example, may start management including generation and maintenance of information regarding a user account such as a user ID. After that, when a user uses a VPN to log in the local authentication service for the cloud service, the user can log in the cloud service with credential information associated with the user.

However, one disadvantage relates to user-ID provisioning for all users to be required for cooperation between a local authentication and a cloud service authentication. Because maintenance of the user-ID provisioning is required every time the number of users increases or decreases, this increases operational costs for the user management.

Aspects of the present invention were made in view of the conventional examples as described above. Aspects of the present invention provide an authorization server, an authentication cooperation system, and a storage medium storing a program, which can eliminate necessity for user-ID provisioning between a local authentication and a cloud service authentication.

One aspect of the present invention can also reduce operational loads because ID provisioning between a local authentication and a cloud service authentication is not necessary.

An exemplary embodiment has the following configurations.

An aspect of the present invention provides an authorization server including a unit configured to, in a case where a client is authenticated successfully on basis of client information in response to an authorization token generation request, transmit an authorization token to the client and generate and store authorization token information by associating local user information received along with the authorization token generation request with the authorization token, and a responding unit configured to receive an authorization token verification request including the authorization token from an application server having received a processing request along with the authorization token from the client, and, in a case where the authorization token is verified successfully on basis of the received authorization token and the authorization token information, transmit the local user information included in the authorization token information to the application server.

Another aspect of the present invention provides an application server including a unit configured to store a local authentication cooperation mode for each tenant, a unit configured to transmit an authorization token verification request to an authorization server when the unit receives a processing request along with an authorization token from a client and receive authorization token information including local user information associated with the authorization token as a response as a result of a success of the authorization token verification request, and a processing unit configured to process the processing request for a user described in the local user information or for the client.

Another aspect of the present invention provides an authentication cooperation system including an authorization server including a unit configured to, in a case where a client is authenticated successfully on basis of client information in response to an authorization token generation request, transmit an authorization token to the client and generate and store authorization token information by associating local user information received along with the authorization token generation request with the authorization token. A responding unit is configured to receive an authorization token verification request including the authorization token from an application server having received a processing request along with the authorization token from the client, and, in a case where the authorization token is verified successfully on basis of the received authorization token and the authorization token information, transmit the local user information included in the authorization token information to the application server. An application server has a unit configured to transmit the authorization token verification request to the authorization server when the unit receives a processing request along with the authorization token from a client and receive the authorization token information including the local user information associated with the authorization token as a response as a result of a success of the authorization token verification request. A processing unit is configured to process the processing request for a user described in the local user information or for the client.

Further features of the present invention will become apparent from the following description of exemplary embodiments with reference to the attached drawings.

BRIEF DESCRIPTION OF THE DRAWINGS

FIG. 3 illustrates a table structure managed in a local authentication server.

FIGS. 4A and 4B illustrate table structures managed in a business server.

FIGS. 5A and 5B illustrate table structures managed in an authorization server.

FIGS. 6A to 6C illustrate table structures managed in a form server.

FIGS. 7A to 7C illustrate table structures managed in a data conversion server.

FIG. 8 illustrates a table structure managed in a storage server.

FIG. 10 illustrates a flow for generating a business form SVG.

DESCRIPTION OF THE EMBODIMENTS

Exemplary embodiments of the present invention will be described below with reference to drawings.

First Exemplary Embodiment

System Configuration

Figure 1:
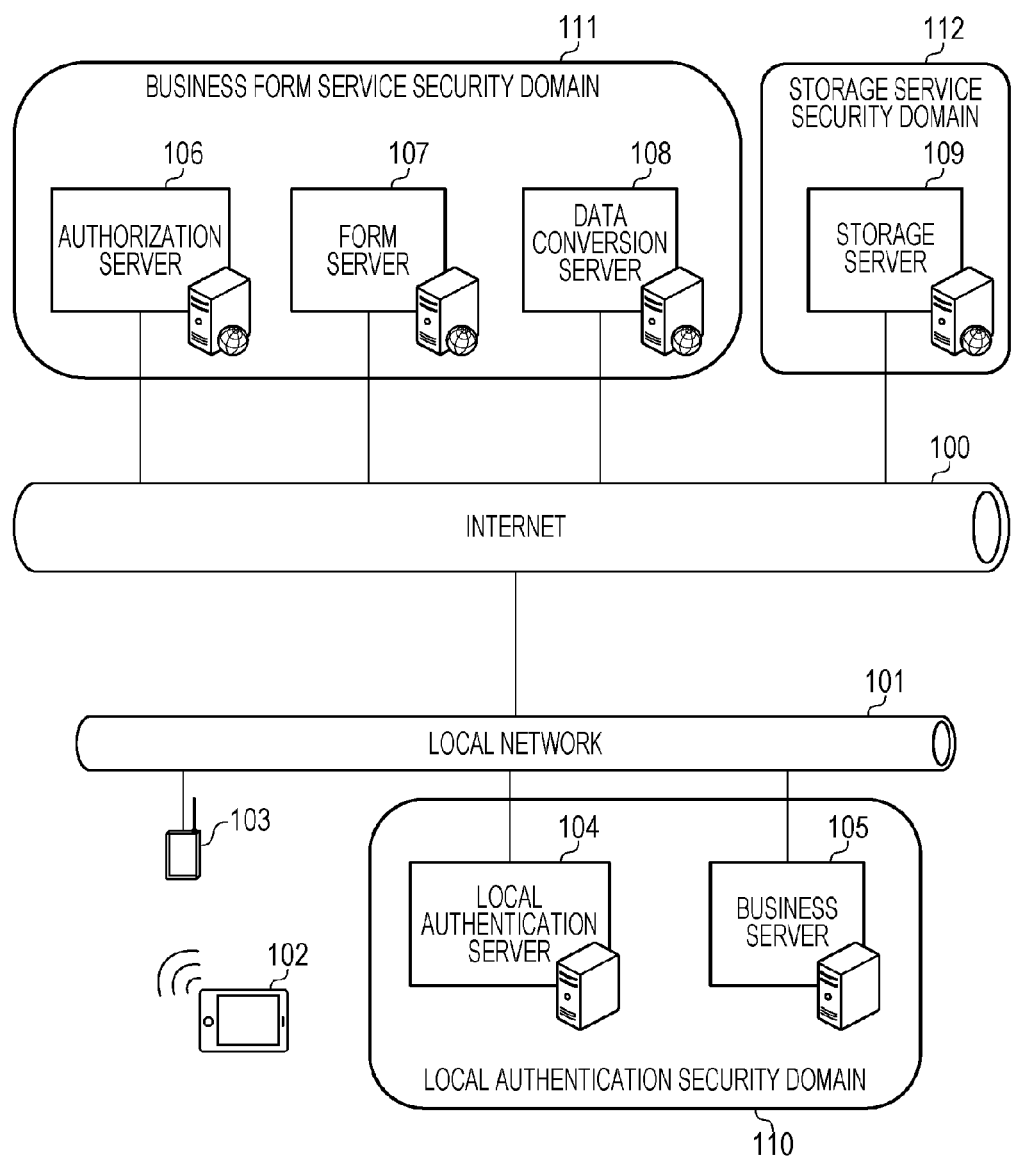
FIG. 1 illustrates a system configuration diagram.

FIG. 1 illustrates an overall configuration of a mobile printing system including an authentication cooperation system according to an exemplary embodiment of the present invention. Referring to FIG. 1, one or a plurality of mobile terminals 102 is connected to a local network 101. The mobile terminal 102 is capable of accessing the internet 100 through the local network 101 to access servers 104 to 109. The mobile terminal 102 is connected to the network through a wired or wireless LAN. This exemplary embodiment assumes that the mobile terminal 102 is connected to the network through a wireless LAN access point 103 but also includes a case where the mobile terminal 102 is connected through a wireless network provided by a mobile data communication carrier. The wireless LAN access point 103 is a wireless LAN base unit having a general network router function and provides a wireless LAN domestically or within an office. The mobile terminal may sometimes be called a client terminal, a client, or a terminal.

Each of security domains 110 to 112 indicates a user accessible, authenticated and authorized range, and an authenticated and authorized user or an authorization token is not allowed to be used beyond such a security domain. In other words, the security domain may refer to an effective range of authentication or authorization. A local authentication security domain 110 indicates a user accessible range authenticated by the local authentication server 104, and a business server 105 belongs to the local authentication security domain 110. A business form service security domain 111 indicates a range accessible by using an authorization token issued by an authorization server 106, and a form server 107 and a data conversion server 108 belong to the business form service security domain 111. A storage service security domain 112 indicates a range accessible by using an authorization token issued by a storage service security domain authorization server, not illustrated, and a storage server 109 belongs to the storage service security domain 112. Referring to FIG. 1, the local authentication security domain 110 corresponds to an ON-premise system, and the business form service security domain 111 and storage service security domain 112 correspond to a cloud system.

The local authentication server 104 is a server for execution of user authentication for access to the business server 105. A user is allowed to access to the business server 105 if he or she is authenticated by the local authentication server 104. LDAP may often be used as a local authentication method, but a simple authentication method only including confirmation of matching of a user name, a password, and a domain may be used according to this exemplary embodiment. However, this is given for illustration purpose only. The invention according to this exemplary embodiment is also applicable to another authentication method in which user authentication is performed by using unique authentication information of a user.

The business server 105 is a server configured to manage user work information. This exemplary embodiment assumes a use case where products for sale are managed client by client in the business server 105 so that the information in the business server 105 may be used by a salesperson for sales work. The business server 105 provides screens for displaying and editing user work information in response to a request from the mobile terminal 102. The authorization server 106 is a server for implementing OAuth and is configured to manage client information and issue and manage an authorization token. The form server 107 is a server configured to receive user work information from the business server 105 and manages a business form PDF generated by reflecting the user work information to a form template. The form server 107 requests the data conversion server 108 to convert the generated business form PDF to a business form SVG (Scalable Vector Graphics). The data conversion server 108 is a server configured to receive a request for the business form SVG conversion from the form server 107 and data-convert and manage a business form PDF to a business form SVG. The storage server 109 is a server configured to perform file management and receive file upload/download from the mobile terminal 102, the form server 107, and the data conversion server 108. OAuth is a mechanism for safely receiving and transmitting (or transferring) a user authorization under an agreement of the user as a precondition, and the authorization server 106 is a server realizing the mechanism. According to OAuth, for example, all or a part of user's rights authorized by a first server are transferred to a second server so that the second server can receive a service provided by the first server within the range or scope of the transferred user's rights. According to OAuth, a user is not required to inform the second server of his or her authentication information for logging in the first server.

Servers including the servers 106 to 109 are open to the Internet as those providing cloud services being redundant with a plurality of servers, but each of them is illustrated as one server here for simple illustration of this exemplary embodiment. The local authentication server 104 and the business server 105 are redundant with a plurality of servers, but each of them is illustrated as one server for simple illustration of this exemplary embodiment. Among servers providing cloud services, servers providing applications to clients, excluding the authorization server 106 and the storage server 109, may sometimes be called collectively as an application server.

Hardware Configuration of Mobile Terminal 102

Figure 2A:
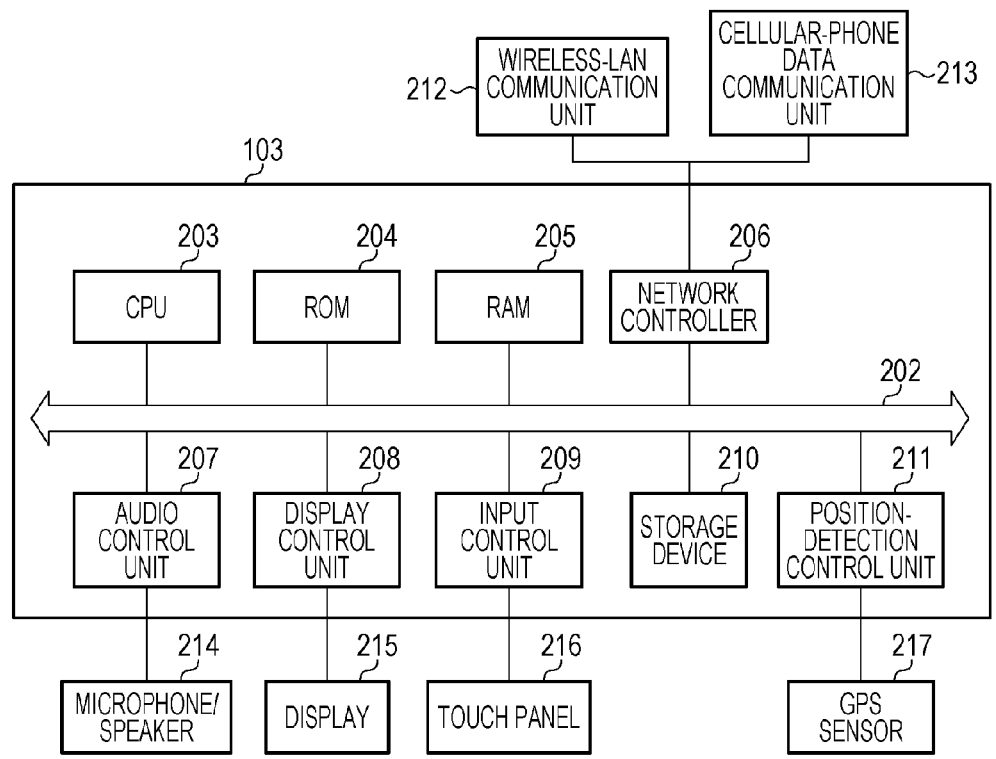
FIGS. 2A and 2B illustrate hardware configuration diagrams of apparatuses.

FIG. 2A is a hardware configuration diagram of the mobile terminal 102. The illustrated hardware components are connected to a system bus 202. A ROM 204 stores an operating system (OS) and applications for controlling phone calls and data communications which are executed by a CPU 203. Such an application for controlling data communication may be e-mail software or a Web browser, for example. The RAM 205 is a work memory area for execution of a program therein. The RAM 205 also functions as memory for temporarily store authentication information for accessing Web page data or a Web service acquired from a Web server by a Web browser. A storage device 210 is a nonvolatile storage device and is configured to store operation mode settings and operation logs which are required to be held after re-activation of the mobile terminal. A network controller 206 is configured to perform communication control over a wireless-LAN communication unit 212 and a cellular-phone data communication unit 213 for participating in a network provided by a cellular phone service carrier. Generally, when participation in a wireless LAN network is allowed, the network controller 206 gives priority to a wireless LAN connection. When the mobile terminal is off the wireless LAN network area, the mobile terminal participates in a wireless communication network provided by a cellular phone service carrier. An audio control unit 207 may be used mainly while a user is calling by activating a phone call application. A microphone/speaker 214 is used to input/output audio data, and the audio control unit 207 intercedes with a control program therefor. A display control unit 208 is configured to control information output by a display 215 of the mobile terminal. An input control unit 209 is configured to control information designated by a user by using a button or a touch panel 216 of the mobile terminal. These audio control unit 207, display control unit 208, and input control unit 209 may be used so that an application on the mobile terminal can provide a user with network communication information and various information regarding the mobile terminal. A position-detection control unit 211 acquires positional information regarding the mobile terminal from a GPS sensor 217 and provides it to an OS. These units are controlled by an OS running on the CPU 203.

Hardware Configuration of Server

Figure 2B:
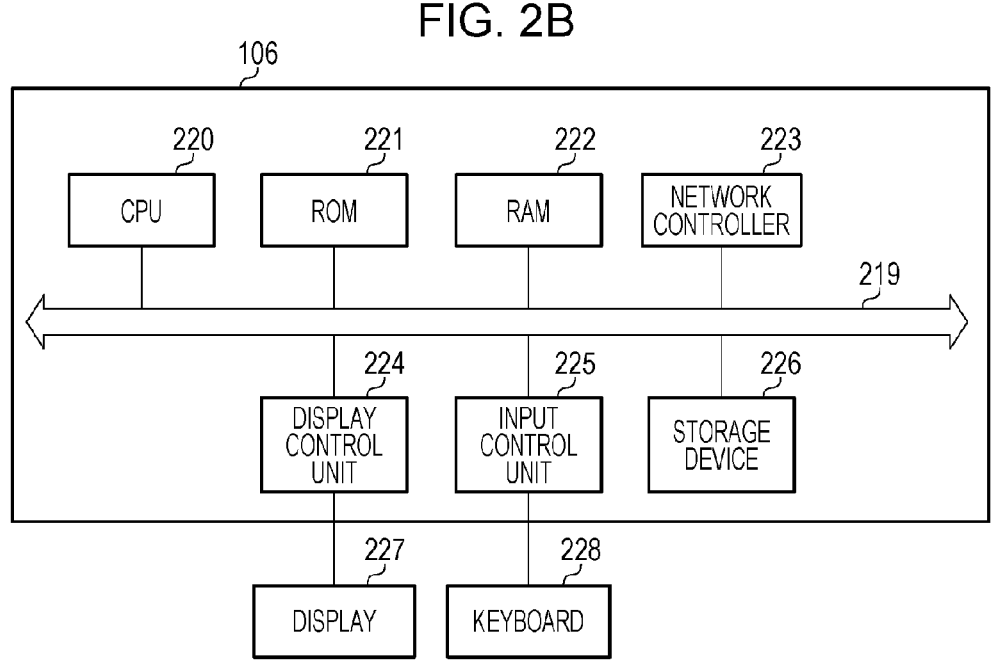

FIG. 2B illustrates an example hardware configuration of each of the servers 104 to 109. The present invention according to this exemplary embodiment is applicable to either single apparatus or system including a plurality of apparatuses if functionality of the invention of this exemplary embodiment is executable unless otherwise specified. Aspects of the present invention are also applicable to a system including apparatuses connected over a network such as a LAN or a WAN for performing processing functionality of the invention of this exemplary embodiment is executable unless otherwise specified. This exemplary embodiment will be described by assuming that the components are connected through a system bus 219.

A CPU 220 is a control device for an image processing apparatus and is configured to execute an application program, a print driver program, an operating system, and a mobile printing system program according to the present invention, which are stored in the storage device 226. The CPU 220 controls to temporarily store in the RAM 222 information and files, for example, required for program execution. The CPU 220 may open various registered windows in response to a command given by using, for example, a mouse cursor, not illustrated, on the display 227 and execute various kinds of data processing. A ROM 221 is a ROM configured to store fixed information and internally store programs such as a basic I/O program and font data, template data, and other various kinds of data usable for document processing. A RAM 222 is a RAM configured to temporarily store information and functions as a main memory and a work area for the CPU 220. A display control unit 224 is configured to control information output on a display 227. An input control unit 225 is configured to control information input through a keyboard 228, and an image processing apparatus can exchange data with an external apparatus through the input control unit 225. A storage device 226 is one of external storages, functions as a large volume memory and stores an application program, a print driver program, an OS and so on. The keyboard 228 is an instruction input unit usable by a user to input an instruction to a server. The display 227 is a display unit configured to display a command input through the keyboard 228, for example.

Software Configuration of Mobile Terminal 102

Figure 9A:
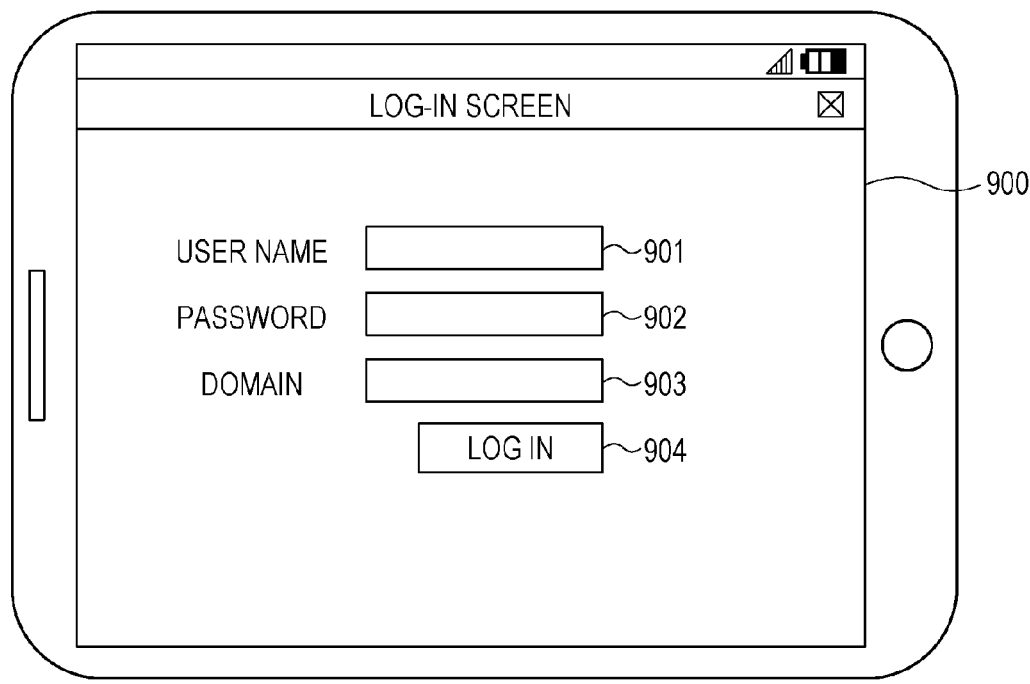
FIGS. 9A to 9C illustrate a screen example of a mobile terminal.
Figure 9B:
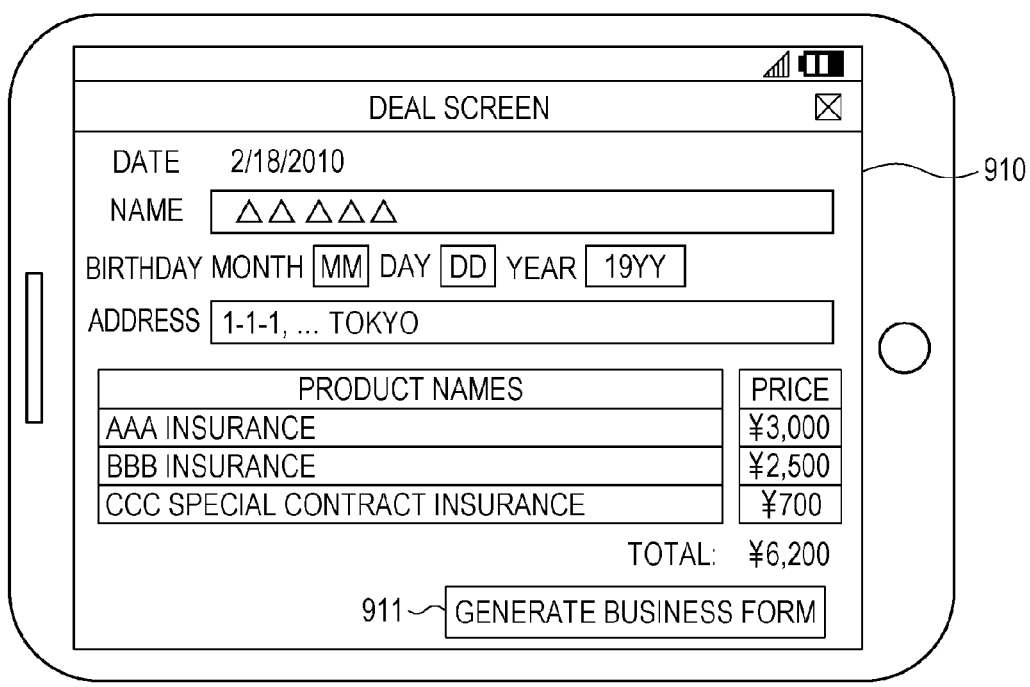
Figure 9C:
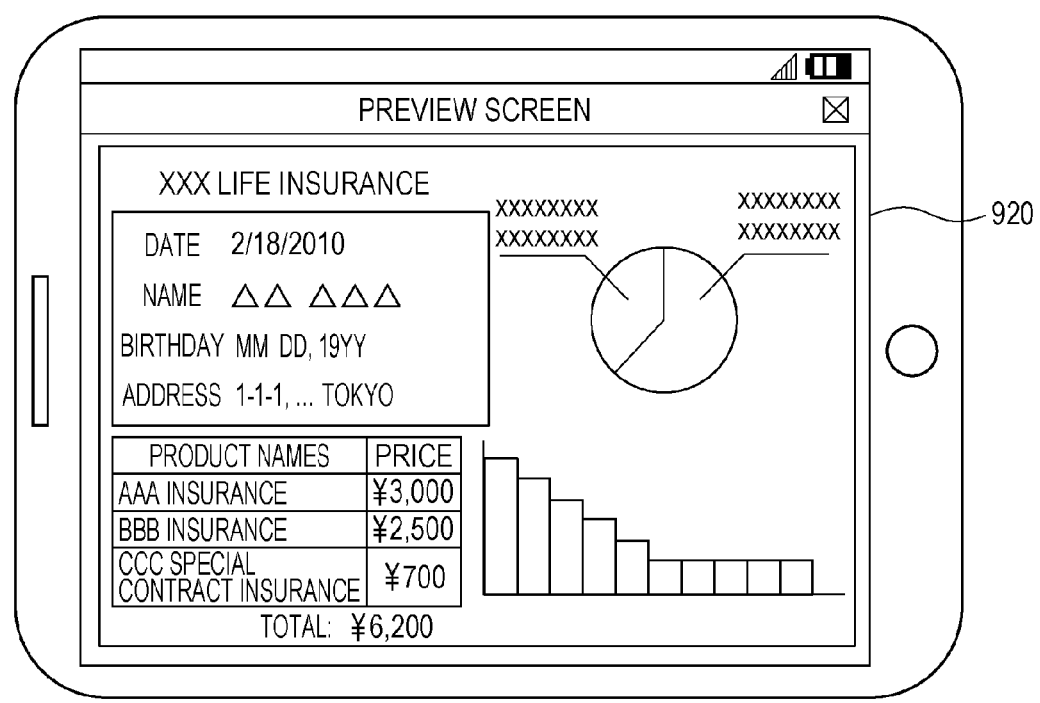
Figure 13:
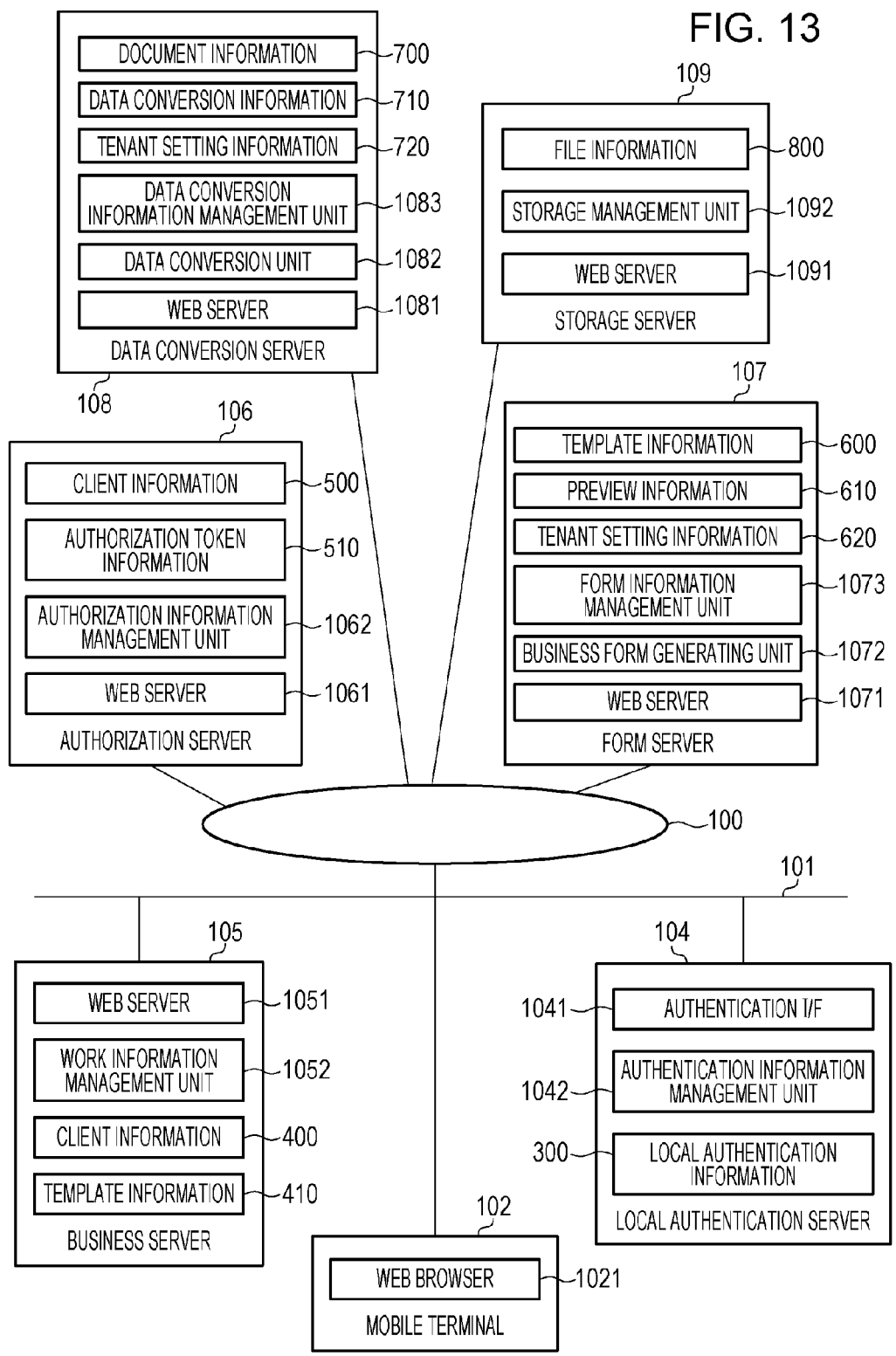
FIG. 13 is a software configuration diagram of apparatuses.

Software configurations of the mobile terminal 102 and the servers will be described with reference to FIG. 13. A browser application (also called a Web browser) 1021 is installed in the 1021. The browser application 1021 installed in the mobile terminal 102 is stored in the storage device 210 illustrated in FIG. 2A and is loaded to the RAM 205 and is executed by the CPU 203. A user may operate a screen displayed on the display 215 of the mobile terminal 102 by using the browser application 1021 to request the servers 105 to 109. The browser application 1021 is capable of analyzing and displaying a screen showing HTML data and SVG data from the business server 105, the form server 107, and the storage server 109. FIGS. 9A to 9C, which will be described below, illustrate example screens to be displayed on the display 215 of the mobile terminal 102 by the browser application 1021. Various applications excluding such a browser application may be installed in the mobile terminal 102. According to this exemplary embodiment, the browser application 1021 is only used. For that, the browser application 1021 will also be handled as the mobile terminal 102.

Software Configuration of Local Authentication Server 104

The local authentication server 104 has an authentication interface (I/F) 1041, an authentication information management unit 1042, and a storage storing local authentication information 300. Software modules are stored in the storage device 226 illustrated in FIG. 2B and are loaded to the RAM 222 and are executed by the CPU 220 as described above. The authentication I/F 1041 provides an interface to the local authentication server 104 and verifies validity of received information. The authentication information management unit 1042 manages the local authentication information 300 illustrated in FIG. 3 and responds failure or success of the user authentication in response to a request received by the authentication I/F 1041.

Software Configuration of Business Server 105

The business server 105 has a Web server 1051, a work information management unit 1052, and a storage storing client information 400 and template information 410. Software modules are stored in the storage device 226 illustrated in FIG. 2B, are loaded to the RAM 222, and are executed by the CPU 220 as described above. The Web server 1051 provides interfaces for the business server 105 and verifies validity of received information, which is then authenticated by the local authentication server 104. The work information management unit 1052 manages the client information 400 and the template information 410 illustrated in FIGS. 4A and 4B. The work information management unit 1052 may further respond work screens illustrated in FIGS. 9A and 9B, which will be described below, to a request received by the Web server 1051, receive a request for generating a business form, and request the form server 107 to generate a preview screen.

Software Configuration of Authorization Server 106

The authorization server 106 has a Web server 1061, an authorization information management unit 1062, and a storage storing client information 500 and authorization token information 510. Software modules are stored in the storage device 226 illustrated in FIG. 2B and are loaded to the RAM 222 and are executed by the CPU 220. The Web server 1061 provides interfaces for the authorization server 106 and verifies validity of received information. The authorization information management unit 1062 manages the client information 500 and authorization token information 510 illustrated in FIGS. 5A and 5B and may issue an authorization token and check a scope and an expiration date in response to a request received by the Web server 1061.

Software Configuration of Form Server 107

The form server 107 has a Web server 1071, a business form generating unit 1072, a form information management unit 1073, and a storage storing template information 600, preview information 610, and tenant setting information 620. Software modules are stored in the storage device 226 illustrated in FIG. 2B and are loaded to the RAM 222 and are executed by the CPU 220. The Web server 1071 provides interfaces for the authorization server 107 and verifies validity of received information. The Web server 1071 may request authorization token verification or authorization token information acquisition to the authorization server 106. The business form generating unit 1072 is configured to generate a business form PDF by reflecting work information received from the business server 105 to a template. The business form generating unit 1072 uploads the generated business form PDF to the storage server 109. The form information management unit 1073 manages the template information 600, preview information 610, and tenant setting information 620 illustrated in FIGS. 6A to 6C, and the business form generating unit 1072 generates a business form PDF in response to a preview generation request received by the Web server 1071 and requests the data conversion server 108 to generate a business form SVG. The storage stores information, as illustrated in FIGS. 6A to 6C, held in the form server 107. A tenant is a division unit of destinations to which a service resource is provided and based on which a user can use and manage a cloud service. A client is a user of a cloud service and operates as a client of a specific tenant. Based on one tenant, a plurality of clients can use a plurality of services. Thus, according to this exemplary embodiment, tenant management is not performed in the local authentication security domain 110 while tenant management is performed in the business form service (that is a cloud service) security domain 111.

Software Configuration of Data Conversion Server 108

The data conversion server 108 has a Web server 1081, a data conversion unit 1082, a data conversion information management unit 1083, and a storage storing document information 700, data conversion information 710, and tenant setting information 720. Software modules are stored in the storage device 226 illustrated in FIG. 2B, are loaded to the RAM 222 and are executed by the CPU 220. The Web server 1081 provides interfaces for the data conversion server 108 and verifies validity of received information. The Web server 1081 may request authorization token verification or authorization token information acquisition to the authorization server 106. The data conversion unit 1082 receives the business form PDF uploaded from the form server 107 to the storage server 109 and converts the business form PDF to a business form SVG. The data conversion unit 1082 uploads the generated business form SVG to the storage server 109. The data conversion information management unit 1083 manages the document information 700, data conversion information 710, and tenant setting information 720 illustrated in FIGS. 7A to 7C, and the data conversion unit 1082 generates a business form SVG in response to a business form SVG generation request received from the Web server 1081. The storage stores information held in the data conversion server 108 illustrated in FIGS. 7A to 7C.

Software Configuration of Storage Server 109

The storage server 109 has a Web server 1091, a storage management unit 1092, and a storage storing file property information 800. Software modules are stored in the storage device 226 illustrated in FIG. 2B, are loaded to the RAM 222, and are executed by the CPU 220. The Web server 1071 provides interfaces for the storage server 109 and verifies validity of received information. A storage authorization server, not illustrated, requests for authorization token verification. The storage management unit 1092 manages file property information 800 illustrated in FIG. 8 and inputs/outputs a file requested to upload. The storage stores information held in the storage server 109 illustrated in FIG. 8 and a file received by the storage server 109.

Data Managed by Local Authentication Server 104

FIG. 3 illustrates a data table stored in a storage by the local authentication server 104. Such a data table may be stored in another server communicatively connected to the Internet 100 or a local network 101 instead of a storage in the local authentication server 104. The data table held in the local authentication server 104 includes local authentication information 300. The local authentication information 300 in FIG. 3 includes a domain name (domain identification information) 301, a user name (user identification information) 302, and a password 303 as user information of a user allowed to access the business server 105. The local authentication server 104 authenticates a user if user authentication information input by the user subject to a local authentication is matched to user authentication information registered as the local authentication information 300. The local authentication information 300 can be used locally within the authentication information local authentication security domain 110.

Data Managed by Business Server 105

FIGS. 4A and 4B are data tables stored by the business server 105 in a storage device. Such a data table may be stored in another server communicatively connected to the Internet 100 or a local network 101 instead of a storage device in the business server 105. The data tables held in the business server 105 include the client information 400 and the template information 410. The client information 400 in FIG. 4A is information to be used by the business server 105 for accessing the form server 107 and is issued by the authorization server 106. A client ID 401 is identification information by which a client can be uniquely identified. A secret 402 is a password corresponding to the client ID 401. A scope 403 is a character string describing a scope of a client's access right. Referring to the example illustrated in FIG. 4A, a character string "SVG_Preview" may indicate that a preview request for SVG document data is included in the scope of the access right. The template information 410 in FIG. 4B includes a template ID 411 designated when the business server 105 issues a preview generation request to the form server 107. The template ID 411 registered with the template information 600 in the form server 107 is held in the business server 105.

Data in Authorization Server 106

FIGS. 5A and 5B illustrate data tables stored in a storage by the authorization server 106. Such a data table may be stored in another server communicatively connected to the Internet 100 or a local network 101 instead of a storage in the authorization server 106. The data table held in the authorization server 106 may include client information 500 and authorization token information 510.

The client information 500 illustrated FIG. 5A includes information regarding a client allowed to access to the servers 106 to 108. According to this exemplary embodiment, information regarding the business server 105 is registered as a client with the client information 500. A client ID 501 is an identifier by which a client can be uniquely identified. According to this exemplary embodiment, "client 0001" being a client ID of the business server 105 is registered. A secret 502 is a password usable for determining validity of a client. The authorization server 106 identifies a client if a pair of a client ID and a secret received from a client is matched with a pair of the client ID 501 and the secret 502 in the client information 500. A scope 503 is an OAuth scope and indicates a range accessible with an authorization token issued by the authorization server 106. The type of the scope 503 according to this exemplary embodiment is defined as SVG_Preview. The SVG_Preview scope is a scope required by the business server 10 for accessing an interface of the form server 107. A tenant ID 504 is an identifier by which a client tenant can be uniquely identified.

The authorization token information 510 in FIG. 5B is generated when the authorization server 106 receives a request to acquire an authorization token. One record is generated in response to one request. The authorization token 511 is an identifier by which an authorization token can be uniquely identified. An expiration date 512 is an expiration date of an authorization token, and a value after a lapse of a predetermined time period from a time when the authorization token acquisition request is received is registered. The authorization token 511 after the expiration date 512 is invalid. The scope 513 is a scope in which the authorization token 511 can be used, and a scope passed to the authorization server 106 along with the authorization token acquisition request is registered therewith. A client ID passed to the authorization server 106 along with the authorization token acquisition request is registered with a client ID 514. An application ID 515 is an identifier by which an application can be identified in a case where a client uses a plurality of applications. The application ID 515 is registered when an application ID is passed to the authorization server 106 along with an authorization token acquisition request. No application ID is registered if no application ID is passed to the authorization server 106 along with an authorization token acquisition request. According to this exemplary embodiment, local user information (user name 302@domain name 301) is designated for an application ID in an authorization token acquisition request from the business server 105 to the authorization server 106 and is registered as the application ID 515. Information excluding a user name and a domain name except for a password from the local authentication information illustrated in FIG. 3 will be called local user information hereinafter.

Data Managed by Form Server 107

FIGS. 6A, 6B, and 6C illustrate data tables stored in an external memory by the form server 107. These data tables may be stored in another server communicatively connected to the Internet 100 or a local network 101 instead of an external memory of the form server 107. The data tables held by the form server 107 include the template information 600 and the preview information 610.

The template information 600 in FIG. 6A is information for managing templates held by the form server 107. A template ID 601 is an identifier by which a template can be uniquely identified and is issued when the template is registered with the form server 107. A tenant ID 602 is a tenant ID of a tenant with which a template is registered. The form server 107 controls an access to a template for each tenant ID 602. A template URL path 603 is a URL path in a storage server 109 storing a template. The form server 107 generates a folder (and file) indicated by a URL path including the template ID 601 in the storage server 109 and stores a template therein.

The preview information 610 in FIG. 6B is information based on which the form server 107 manages preview processing. A preview ID 611 is issued and registered when the form server 107 receives a preview generation request. A tenant ID 612 is a tenant ID of a tenant being a requestor of a preview generation request. A user ID 613 is an identifier of a user being a requestor of a preview generation request. With the user ID 613, identification information combining a tenant ID and local user information (user name 302@domain name 301) is registered according to this embodiment. The local user information corresponds to the application ID 515 included in the authorization token information 510. A data conversion ID 614 is an identifier by which a data conversion process can be identified, which is received by the form server 107 in response to a business form SVG generation request to the data conversion server 108. A business form PDF URL path 615 is a URL path in the storage server 109 storing a business form PDF. The form server 107 generates a folder (and file) indicated by a URL path including the preview ID 611 in the storage server 109 and stores a business form PDF therein.

The tenant setting information 620 in FIG. 6C is setting information for each tenant in the form server 107. As a setting for the tenant ID 621, local authentication cooperation mode 622 is held. The local authentication cooperation mode 622 exhibits "true" or "false" to indicate whether the cooperation with the local authentication security domain 110 is enabled or not, respectively. For example, "true" indicates that the cooperation is enabled while "false" indicates that the cooperation is not enabled. The tenant setting information may be set for each server, but tenant sharing information set in a specific server may be shared by a plurality of servers. Thus, for example, when tenant setting information is updated in a certain server, it may be distributed to the other servers.

Data Managed by Data Conversion Server 108

FIGS. 7A, 7B, and 7C illustrate data tables stored in an external memory by the data conversion server 108. The data tables held by the data conversion server 108 include document information 700, data conversion information 710, and tenant setting information 720.

The document information 700 in FIG. 7A is generated when the data conversion server 108 receives a business form SVG generation request. One record is generated in response to one request. A document ID 701 is an identifier which is issued when the data conversion server 108 receives a business form SVG generation request and by which a document can be uniquely identified. The tenant ID 702 is a tenant ID of a tenant of a requestor issuing a business form SVG generation request. The user ID 703 is an identifier of a user being a requestor issuing a business form SVG generation request. With the user ID 703, a combination of a client ID and local user information (user name 302@domain name 301) is registered. A document URL 704 is a URL path in the storage server 109 storing a business form PDF. The document URL 704 is passed to the data conversion server 108 as a parameter of a business form SVG generation request from the form server 107.

The data conversion information 710 in FIG. 7B is generated when the data conversion server 108 receives a business form SVG generation request. One record is generated in response to one request. A data conversion ID 711 is an identifier which is issued when the data conversion server 108 receives a business form SVG generation request and by which a data conversion process can be uniquely identified. A tenant ID 712, a user ID 713, and a document ID 714 exhibit equal values to those of the tenant ID 702, user ID 703, and document ID 701, respectively, in the document information 700 generated when the data conversion server 108 receives a data conversion request. An index URL 715 is a URL in the storage server 109 storing an index file being a URL list of business form SVGS generated by the data conversion server 108. In a case where a business form SVG having a plurality of pages is generated, a plurality of URLs of the business form SVG on the storage server 109 is described in the index file. The index URL 715 is generated and stored by including the data conversion ID 711 in the URL path such that the index URL 715 can be unique in the storage server 109 when the data conversion server 108 completes the generation of the business form SVG. A status 716 indicates a data conversion state of the data conversion server 108 and is updated by the data conversion server 108 in accordance with the data conversion state. The status 716 may exhibit "STANDBY" and "CONVERTED".

The tenant setting information 720 in FIG. 7C is setting information for each tenant in the data conversion server 108. The tenant setting information 720 is the same kinds of information as the tenant setting information 620 for the form server 107.

Data in Storage Server 109

FIG. 8 illustrates a data table stored in an external memory by the storage server 109. The data table may be stored in another server communicatively connected to the Internet 100 or a local network 101 instead of an external memory of the storage server 109. The data table held storage server 109 includes file property information 800. The file property information 800 in FIG. 8 is information regarding a file stored in the storage server 109. A data URL 801 is a URL by which a file stored in the storage server 109 can be uniquely identified. A file path 802 is a file path on a storage and indicates a storage location of a file. A request may be issued to the data URL 801 to manipulate the corresponding file in the storage. For example, when an HTTP GET method is a requested to the data URL 801, the corresponding file can be downloaded. When an HTTP PUT method to which a file is attached is requested to the data URL 801, the file can be uploaded and be stored. When an HTTP DELETE method is requested to the data URL 801, the corresponding file can be deleted.

Screens on Mobile Terminal 102

FIGS. 9A, 9B, and 9C illustrate example screens which are presented by a browser application for display on the mobile terminal 102 and which are displayed on the display 215 through the display control unit 208 in FIG. 2A. A log-in screen 900 in FIG. 9A is a screen for logging in the local authentication server 104, which is responded by the business server 105 upon a first access from the mobile terminal 102 to the business server 105. When a user name 901, a password 902, and a domain 903 are entered and a log-in button 904 is pressed, a local authentication request is transmitted to the business server 105. The user name 901, password 902, and domain 903 transmitted along with a local authentication request are compared to the local authentication information 300 registered with the local authentication server 104 for authentication. A deal screen 910 in FIG. 9B is a screen displaying work information on a user who is logging in through the log-in screen 900. When the business server 105 receives a local authentication request and if the local authentication server 104 authenticates it, a deal screen 910 including work information on the authenticate user is responded. If a business form generation button 911 is pressed on the deal screen 910, a business form generation request is transmitted to the business server 105. A preview screen 920 in FIG. 9C is a screen for displaying a business form SVG, and a business form SVG generated by the form server 107 is displayed on a screen on the mobile terminal 102.

Business Form SVG Preview Flow

Figure 14:
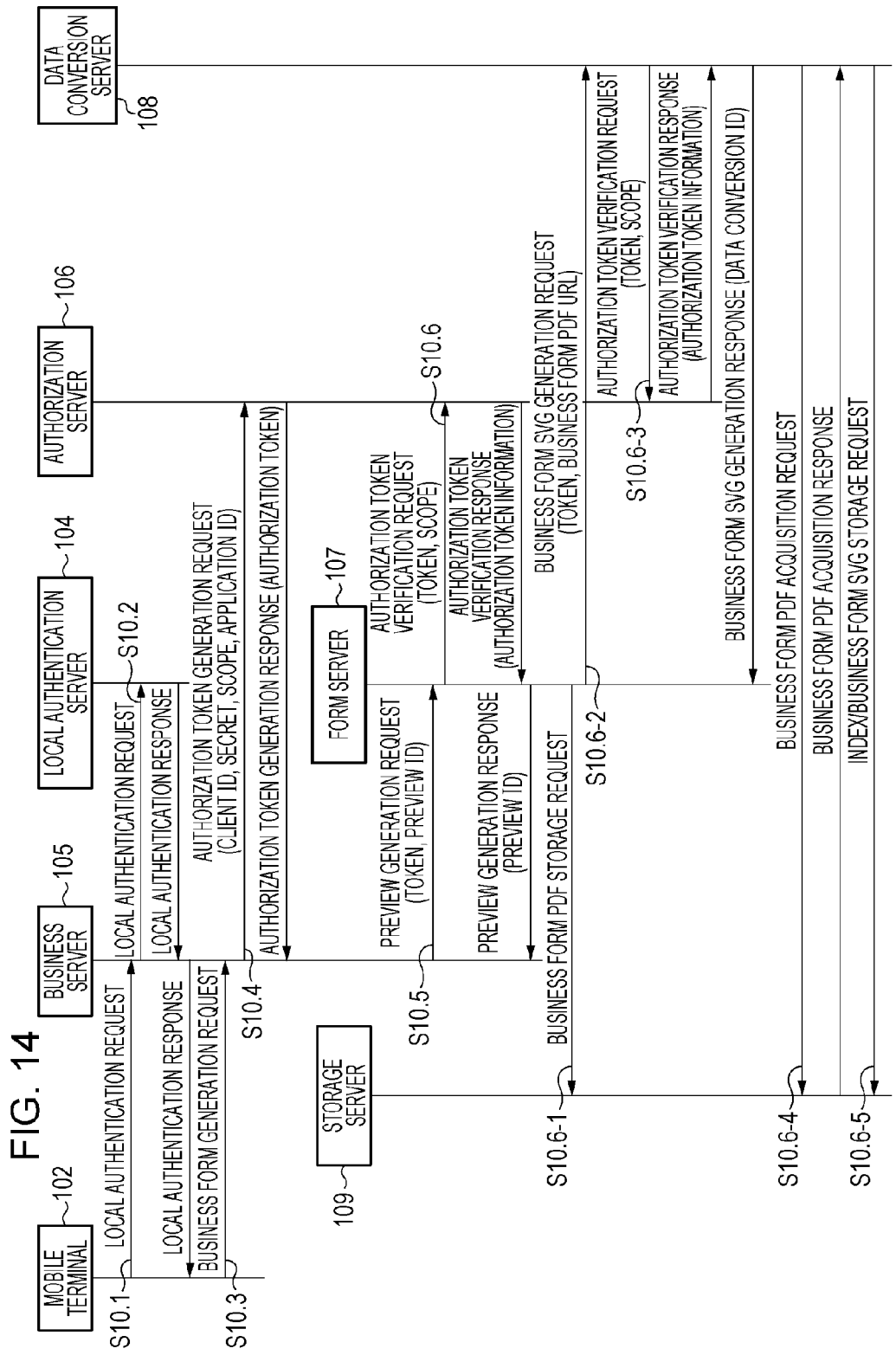
FIG. 14 is a sequence diagram illustrating in time-series the flow for generating a business form SVG.
Figure 15:
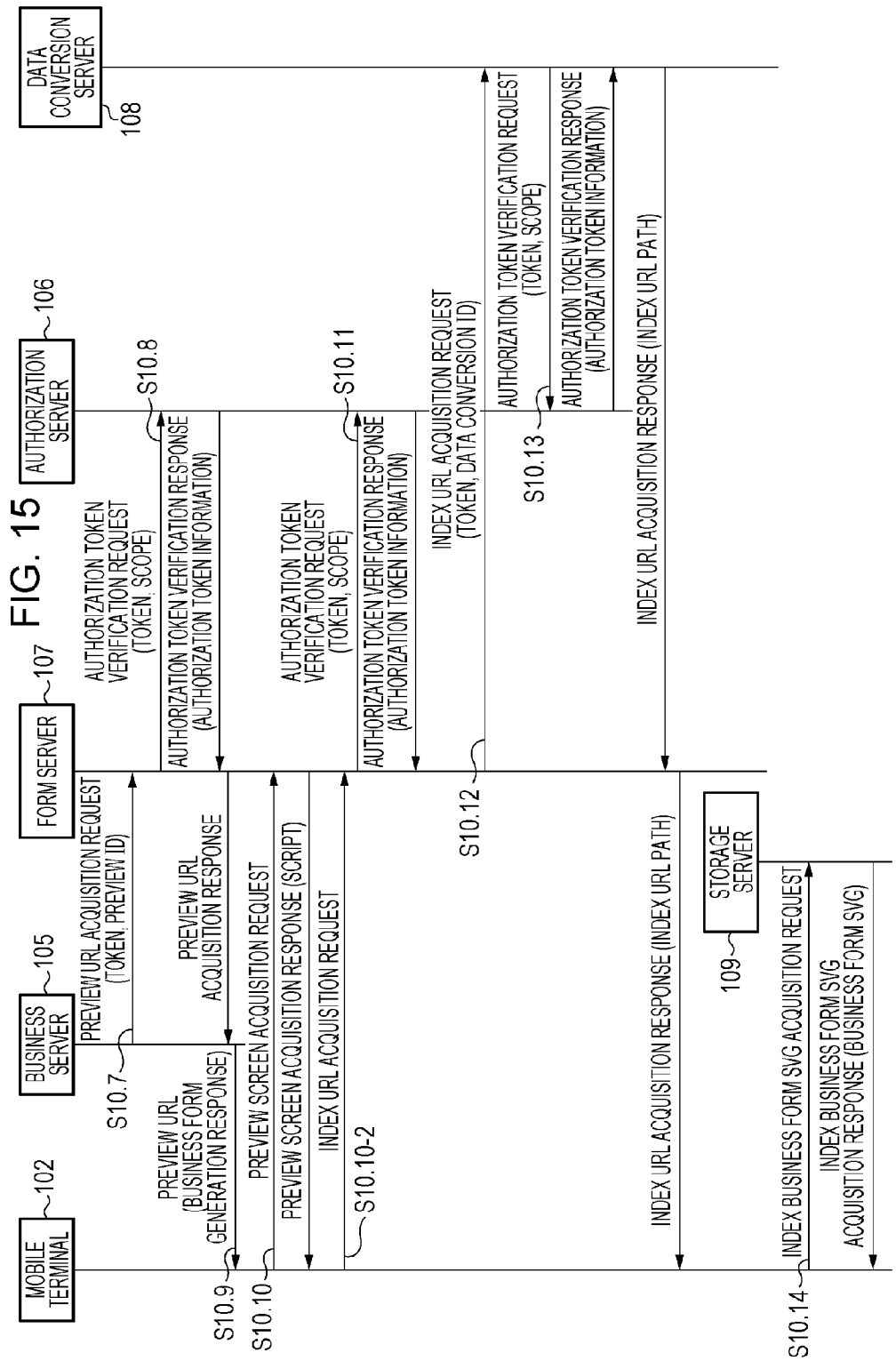
FIG. 15 is a sequence diagram illustrating in time-series the flow for generating a business form SVG.

FIG. 10 is a processing flow from a press of the log-in button 904 on the log-in screen 900 to display the preview screen 920. FIGS. 14 and 15 are sequence diagrams illustrating the processing flow in time-series manner. The terms "transmit" and "receive" are used in the following description. However, they do not necessarily limit the transmission and reception to electrical communications in some configurations of servers, but the communications may include communications between processes. FIG. 10 illustrates arrows each indicating a request but does not illustrate a response to the request for avoiding complexity. However, a certain response is returned to a request as will be described below.

If the log-in button 904 is pressed on the log-in screen 900 in S10.1, a local authentication request having a user name, a password, and a domain as parameters is transmitted from the mobile terminal 102 to the business server 105.

The business server 105 receiving the local authentication request from the mobile terminal 102 transmits a local authentication request to the local authentication server 104 in S10.2. The parameters are transmitted in the local authentication request in S10.1 and S10.2. The local authentication server 104 receiving the local authentication request compares the request parameters of the user name, password, and domain to the domain name 301, user name 302, and password 303 in the local authentication information 300 for authentication. The authentication result is responded to the business server 105. If the authentication result received from the local authentication server 104 by the business server 105 is "success", a deal screen 910 is generated by using the work information on the authenticated user and is returned to the mobile terminal 102 as a response in S10.1. If the authentication result is "failure", a screen showing the fact is responded from the local authentication server 104 to the mobile terminal 102 through the business server 105.

If the business form generation button 911 is pressed on the deal screen 910 in S10.3, a business form generation request is transmitted from the mobile terminal to the business server 105. The business server 105 receiving the business form generation request in S10.3 performs processing in S10.4, S10.5, and S10.7, which will be described below, and responds a URL of a preview screen to the mobile terminal 102 along with an authorization token and a preview ID in S10.9.

The business server 105 in S10.4 transmits an authorization token generation request to the authorization server 106. The business server 105 transmits, as parameters of the authorization token generation request, client information including the client ID 401, the secret 402, and the scope 403 and local user information (user name 302@domain name 301) of the user authenticated in S10.2 as an application ID. The client information may sometimes be called credential information. It can be said that the local user information is identification information of a requesting user of a request (business form generation request in S10.3) in response to which the business server 105 being a client of a cloud service requests a cloud service. The authorization server 106 receiving the authorization token generation request in S10.4 determines whether the client ID, secret, and scope of the parameters exist in the client information 500 or not. If the client ID 501, secret 502, and scope 503 are matched thereto, an authorization token 511 is issued, and a record corresponding to the issued authorization token is added to the authorization token information 510. At that time, the authorization server 106 registers the scope, client ID, application ID received in the parameters in the authorization token generation request in S10.4 with the record added to the authorization token information 510. The authorization server 106 returns the authorization token 511 issued as a response to the authorization token generation request in S10.4 to the business server 105.

In S10.5, the business server 105 receiving the authorization token 511 transmits a preview generation request to the form server 107. The business server 105 transmits the authorization token received as a response to the authorization token generation request in S10.4, the template ID 411, and the work information used for generating the deal screen 910 in S10.2 as the parameters of the preview generation request in S10.5.

In S10.6, the form server 107 transmits an authorization token verification request to the authorization server 106 by using the authorization token received in response to the preview generation request in S10.5 and a scope as the parameters. The scope to be designated here may be SVG_Preview corresponding to the preview generation request, for example. The authorization server 106 receiving the authorization token verification request in S10.6 verifies whether or not any record matched to the authorization token and scope received as the parameters exists in the authorization token information 510. If there is a matched record, the record information (hereinafter, called authorization token information) is responded. In this case, the authorization token information to be responded further includes a tenant ID corresponding to the client ID 514 included in the authorization token information. The whole client information 500 may be included therein, but the tenant ID is enough in this exemplary embodiment. If no record is matched to the received authorization token and scope, "ERROR" is responded. When the form server 107 receives the authorization token information in response to an authorization token verification request, the preview ID 611 is issued, and the record is registered with the preview information 610. The tenant ID of the received authorization token information is recorded as the tenant ID 612 of the record, and the application ID of the authorization token information is recorded as the user ID 613. The form server 107 returns to the issued preview ID 611 to the business server 105 in response to the preview generation request in S10.5.

In S10.6-1, the form server 107 identifies the template with the template ID 601 matched to the template ID received as the parameter of the preview generation request in S10.5 from the template information 600. The template file is acquired from the template URL path 603 of the identified template. The form server 107 generates a business form PDF by reflecting work information to the template file. The business form PDF is form data in a PDF format. The form server 107 generates a URL path on the storage server 109 from the preview ID generated in S10.6 and registers the generated URL path with the business form PDF URL path 615 corresponding to the preview ID 611 in the preview information 610. The generated business form PDF is uploaded to the business form PDF URL path 615.

In S10.6-2, the form server 107 transmits a business form SVG generation request to the data conversion server 108. The form server 107 designates, as parameters of the business form SVG generation request, the authorization token received along with the preview generation request in S10.5 and the business form PDF URL path 615 generated in S10.6-1.

In S10.6-3, the data conversion server 108 transmits an authorization token verification request to the authorization server 106 by using the authorization token received along with the business form SVG generation request in S10.6-2 and a scope as parameters thereof. The scope designated here is SVG_Preview corresponding to the business form SVG generation request, for example. The authorization token verification request is processed in the same manner as in S10.6.

When the data conversion server 108 receives the authorization token information in response to the authorization token verification request in S10.6-3, the data conversion server 108 issues a document ID 701 and a data change ID 711 and registers them with the document information 700 and the data conversion information 710, respectively, as new records. With the tenant IDs 702 and 712 here, the tenant ID in the authorization token information received in S10.6-3 is registered. With the user IDs 703 and 713, the application ID in the authorization token information received in S10.6-3 is registered. With the document URL path 704, the business form PDF URL path being the parameter of the business form SVG generation request received in S10.6-2 is registered. With the document ID 714, the same one as the document ID 701 in the document information 700 is registered. The data conversion server 108 returns to the issued data conversion ID 711 to the form server 107 in response to the business form SVG generation request in S10.6-2. The form server 107 which receives a data conversion ID in response to the business form SVG generation request in S10.6-2 registers the received data conversion ID with the data conversion ID 614 in the preview information 610.

In S10.6-4, the data conversion server 108 acquires a business form PDF from the business form PDF URL path 704 and converts the business form PDF to a business form SVG. The business form SVG is form data in an SVG format.

In S10.6-5, the data conversion server 108 generates a business form SVG URL path and an index URL path on the storage server 109 and uploads the business form SVG converted in S10.6-4 to the business form SVG URL path. The data conversion server 108 uploads an index file being a list of business form SVG URL paths to the index URL path. The data conversion server 108 registers the index URL path 715 with the data conversion information 710.

In S10.7, the business server 105 transmits a preview URL acquisition request to the form server 107. The business server 105 designates, as parameters of the preview URL acquisition request in S10.7, the authorization token received in response to the authorization token generation request in S10.4 and the preview ID received in response to the preview generation request in S10.5. The business server 105 transmits the preview URL acquisition request in S10.7 out of synchronization with the processing in S10.6-1 to S10.6-5 as described above immediately after a response to the preview generation request in S10.5 is received. Thus, the processing in S10.6-1 to S10.6-5 in FIG. 14 and the processing in S10.7 and subsequent thereto in FIG. 15 are performed out of synchronization with each other. Thus, if the storage of the index and business form SVG in S10.6-5 is not completed when the index and business form SVG are requested in S10.14, the business form SVG cannot be responded to the mobile terminal 102. In this case, the mobile terminal 102 repeats the attempt in S10.14 until the attempt results in a success.

In S10.8, the form server 107 receiving a preview URL acquisition request designates, as parameters, the authorization token of the parameter and a scope and transmits an authorization token verification request to the authorization server 106. The scope to be designated may be SVG_Preview corresponding to the preview URL acquisition request, for example. The authorization token verification request is processed in the same manner as in S10.6 as described above.

When the form server 107 receives authorization token information in response to the authorization token verification request in S10.8, the form server 107 identifies from the preview information 610 a record matched to the preview ID received as a parameter of the preview URL acquisition request in S10.7. The form server 107 returns to the preview URL of the form server 107 in response to the preview URL acquisition request in S10.7. For the preview screen URL returned by the form server 107, the preview ID and authorization token received in S10.7 are designated as a URL parameter.

In S10.9, the business server 105 returns the preview screen URL of the form server 107 received in S10.7 to the mobile terminal 102 in response to the business form generation request in S10.3. Along with the preview screen URL, the preview ID and authorization token received in response to the preview URL acquisition request in S10.7 are transmitted to the mobile terminal 102.

In S10.10, the mobile terminal 102 transmits a preview screen acquisition request to the preview screen URL received in S10.9. The server (form server 107 here) designated with the preview screen URL responds to the mobile terminal 102 a script for executing processing in S10.10-2 as a content of the designated URL.

In S10.10-2, the mobile terminal 102 executes the received script and transmits an index URL acquisition request to the form server 107. In this case, as a parameter of the index URL acquisition request, the preview ID and authorization token received in S10.9 are also transmitted.

In S10.11, the form server 107 in response to the index URL acquisition request designates the authorization token designated with the URL parameter and a scope as parameters and transmits an authorization token verification request to the authorization server 106. The scope designated here may be SVG_Preview corresponding to the index URL acquisition request, for example. The authorization token verification request is processed in the same manner as in S10.6 as described above.

When the form server 107 receives the authorization token information in response to the authorization token verification request in S10.11, the form server 107 identifies, from the preview information 610, a record matched to the authorization token preview ID designated in the URL parameters in the index URL acquisition request. If the data conversion ID 614 is not registered with the identified preview information 610, the form server 107 responds "ERROR" in S10.10 because a business form PDF has not been generated yet.

In S10.12, if the data conversion ID 614 is registered with the identified preview information 610, the form server 107 transmits an index URL acquisition request to the data conversion server 108 by defining the data conversion ID 614 and the authorization token received in S10.7 as parameters therein.

In S10.13, the data conversion server 108 designates, as parameters, the authorization token being the parameter in the index URL acquisition request and a scope and transmits an authorization token verification request to the authorization server 106. The authorization token verification request is processed in the same manner as in the S10.6. The scope designated here may be SVG_Preview corresponding to the index URL acquisition request, for example.

If the data conversion server 108 receives the authorization token information in response to the authorization token verification request in S10.13, the data conversion server 108 identifies, from the data conversion information 710, a record matched to the data conversion ID received as the parameter in the index URL acquisition request in S10.12. If the identified data conversion information 710 has a status 716 of "CONVERTED", the index URL path 715 is returned to the form server 107 as a response to the index URL acquisition request in S10.12. The form server 107 returns the received index URL path to the mobile terminal 102 as a response to the index URL acquisition request in S10.10-2. Here, if the identified data conversion information 710 has a status 716 other than "CONVERTED", the data conversion server 108 returns "ERROR" as a response in S10.12 to the form server 107 because a business form SVG has not been generated yet. The form server 107 responds "ERROR" to the index URL acquisition request in S10.10-2. The mobile terminal 102 retries as a response to the processing in S10.10-2 until a business form SVG can be generated and the index URL path thereof can be received.

In S10.14, the mobile terminal 102 acquires an index from the index URL path acquired as a response to the index URL acquisition request in S10.10-2. Then, a business form SVG is acquired from the business form SVG URL described in the index, and the business form SVG is displayed on a preview screen 920. In other words, subsequent to the index acquisition, a request for a business form SVG is transmitted, and the business form SVG is responded. The processes are illustrated in a simplified manner in FIGS. 10 and 15.

Flow of Issuance of Authorization Token by Authorization Server 106

Figure 11:
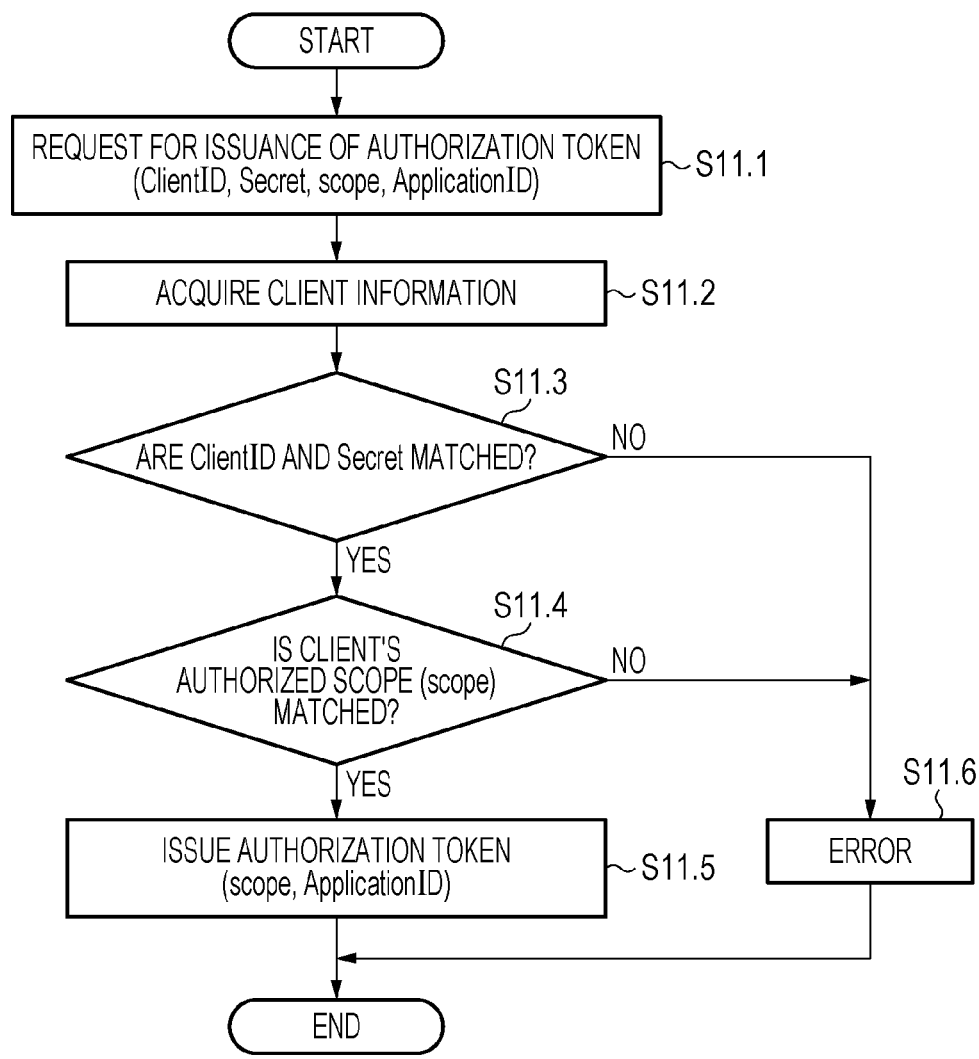
FIG. 11 illustrates a flow for issuing an authorization token.

FIG. 11 illustrates details of a flow of processing for issuing an authorization token when the authorization server 106 receives an authorization token request (S10.4).

In S11.1, the authorization server 106 receives an authorization token request. The authorization server 106 receives a client ID, a secret, a scope, and an application ID as parameters in the authorization token request.

In S11.2, the authorization server 106 identifies a record matched to the client ID received in S11.1 from the client information 500.

In S11.3, the authorization server 106 determines whether the client ID 501 and the secret 502 in the client information 500 identified in S11.2 are matched to the client ID and secret received in S11.1. If they are not matched, "ERROR" is returned (S11.5).

In S11.4, the authorization server 106 determines whether the scope 503 in the client information 500 identified in S11.2 is matched to the scope received in S11.1. If they are not matched, "ERROR" is returned (S11.5).

In S11.5, the authorization server 106 issues an authorization token ID 511 registers the client ID, scope, and application ID received in S11.1 as records with the authorization token information 510. Local user information (user name 302@domain name 301) is designated in the application ID in the processing in S10.4. However, a request from a client not involved in the local authentication cooperation has a null or different value in the application ID.

Through the procedure as described above, local user information by which a local user can be identified is registered in association with the authorization token as the authorization token information 510. If the authorization token is verified successfully by the authorization server 106, the authorization token information 500 is returned to the requestor of the verification. Thus, a server requesting the verification of the authorization token received along with the request can acquire the local user information if the requestor of the request is a local user.

Flow of Verification of Authorization Token by Form Server 107 and Data Conversion Server 108

Figure 12:
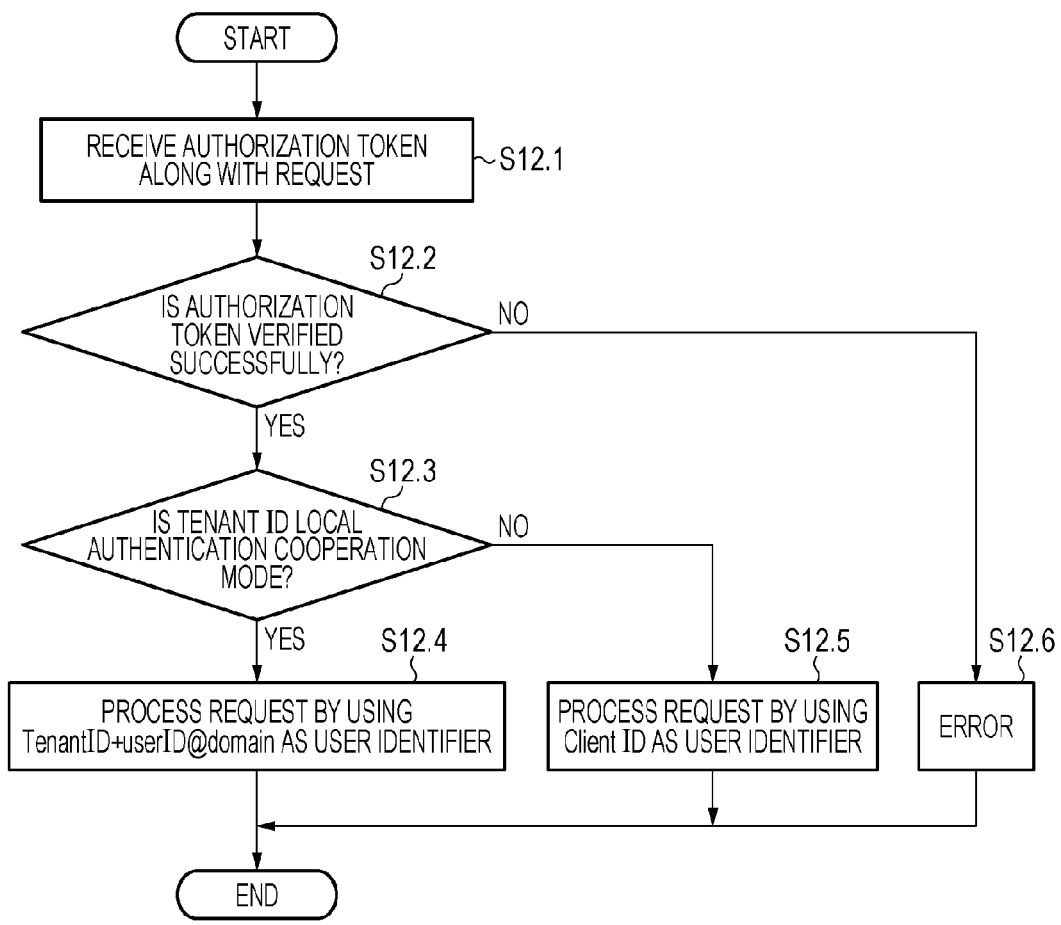
FIG. 12 illustrates a flow for using an authorization token.

FIG. 12 illustrates details of a flow of processing for authorization token verification when the form server 107 or the data conversion server 108 receives a request (S10.5, S10.6-1, S10.7, S10.10, S10.11, and S10.12).

In S12.1, the form server 107 or the data conversion server 108 receives a request. An authorization token is received as a parameter of the request.

In S12.2, the form server 107 or the data conversion server 108 transmits an authorization token verification request to the authorization server 106. If authorization token information is not acquired as a result of the authorization token verification request, "ERROR" is returned (S12.6). If the authorization token verification results in "success", authorization token information is returned as the response. The returned information includes a tenant ID.

The form server 107 or data conversion server 108 in S12.3 identifies a record matched to the tenant ID in the authorization token information from the tenant setting information 620 or 720. Then, whether the local authentication cooperation mode 622 or 722 of the tenant is enabled or not is determined.

If the local authentication cooperation mode of the tenant is enabled in S12.4, the form server 107 or the data conversion server 108 processes the request by handling the local user information (user name 302@domain name 301) registered with the tenant ID and the application ID in the authorization token information as a unique user.

If it is determined in S12.5 that the local authentication cooperation mode of the tenant is disabled, the form server 107 or the data conversion server 108 processes the request by handling the client ID in the authorization token information as a unique user.

Local authentication information is associated with an authorization token in local user information upon issuance of the authorization token so that the local user information can be acquired from the authorization token information when the user is verified by using the authorization token. Use of the local user information allows unique identification of the user as a user of the local authentication server 104 in the form server 107 and the data conversion server 108. The local user information associated with the authorization token may be processed as identification information describing a unique user in charging processing and totalization processing in the form server 107 or the data conversion server 108, for example, so that it can be used in cooperation with the local authentication server 104. This can eliminate the necessity for ID provisioning between the local authentication security domain 110 and the business form service security domain 111, which can reduce the operation load. The business server 105 uses one client to issue an authorization token, but use of the issued authorization token is limited by the local authentication information. Thus, information regarding other users cannot be accessed by using the authorization token. Therefore, the authentication cooperation can be implemented securely.

The enable/disable of the local authentication cooperation mode may be defined as a setting for each tenant so that a specific tenant in a multitenant mode can only enable the local authentication cooperation and that client's needs can be met flexibly in authentication and authorization processing.

Local authentication information can be associated with an authorization token instead of local user information. According to this exemplary embodiment, a business form generation request is exemplarily given as a processing request. However, the invention according to this exemplary embodiment is also applicable to other processing requests.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-239749, filed Dec. 8, 2015, which is hereby incorporated by reference herein in its entirety.

What is claimed is:

1. An authentication cooperation system comprising an authorization server, the authorization server comprises:
   at least one processor; and
   at least one memory having instructions stored thereon that, when executed by the at least one processor, controls the processor act as:
   a unit configured to, in a case where a client is authenticated successfully on basis of client information in response to an authorization token generation request, transmit an authorization token to the client and generate and store authorization token information by associating local user information received along with the authorization token generation request with the authorization token; and
   a responding unit configured to receive an authorization token verification request including the authorization token from an application server having received a processing request along with the authorization token from the client, and, in a case where the authorization token is verified successfully on basis of the received authorization token and the authorization token information, transmit identification information of a tenant corresponding to the client information and the local user information included in the authorization token information to the application server; and
   the application server including at least one processor and at least one memory storing instructions that, when executed by the at least one processor, controls the at least one processor to act as:
   a receiving unit configured to transmit the authorization token verification request to the authorization server when the receiving unit receives the processing request along with the authorization token from the client and receive the authorization token information including the local user information associated with the authorization token and the identification information of the tenant corresponding to the client information and the local user information included in the authorization token information as a response as a result of a success of the authorization token verification request; and
   a storing unit configured to store a local authentication cooperation mode indicating whether cooperation with a local authentication security domain is enabled or not, for each tenant; and
   a processing unit configured to process the processing request with the local user information included in the authorization local information as a user identification in a case where the local authentication cooperation mode of the tenant described in the identification information of the tenant is enabled and process the processing request with the identification of the client which is included in the authorization token information as the user identification in a case where the local authentication cooperation mode is not enabled.

2. The authorization server according to claim 1,
   wherein the client information includes the identification information of the client and identification information of the tenant of the client; and
   wherein the responding unit transmits, as a part of the authorization token information, the identification information of the tenant of the client requesting to generate the authorization token verified successfully.

3. The authorization server according to claim 1, wherein the local user information includes information describing a domain accessible by a user authenticated by a local authentication server and user identification information in the domain.

4. The authorization server according to claim 1,
   wherein the authorization token verification request is received from an application server having received a processing request from the client along with the authorization token; and
   wherein the local user information is used by the application server for identifying a user being a requestor of the processing request.

5. A non-transitory computer readable storage medium storing instructions that, when executed by at least one processor of a device, causes the device to act as:
   a unit configured to, in a case where a client is authenticated successfully on basis of client information in response to an authorization token generation request, transmit an authorization token to the client and generate and store authorization token information by associating local user information received along with the authorization token generation request with the authorization token; and
   a responding unit configured to receive an authorization token verification request including the authorization token from an application server having received a processing request along with the authorization token from the client, and, in a case where the authorization token is verified successfully on basis of the received authorization token and the authorization token information, transmit identification information of a tenant corresponding to the client information and the local user information included in the authorization token information to the application server; and
   a storing unit configured to store a local authentication cooperation mode indicating whether cooperation with a local authentication security domain is enabled or not, for each tenant; and
   a processing unit configured to process the processing request with the local user information included in the authorization local information as a user identification in a case where the local authentication cooperation mode of the tenant described in the identification information of the tenant is enabled and process the processing request with the client information which is included in the authorization token information as the user identification in a case where the local authentication cooperation mode is not enabled.

* * * * *